United States Patent
Keshet et al.

(10) Patent No.: US 7,418,130 B2
(45) Date of Patent: Aug. 26, 2008

(54) EDGE-SENSITIVE DENOISING AND COLOR INTERPOLATION OF DIGITAL IMAGES

(75) Inventors: Renato Keshet, Haifa (IL); Casey Miller, Fort Collins, CO (US); Benjamin D. Kimbell, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 762 days.

(21) Appl. No.: 10/835,609

(22) Filed: Apr. 29, 2004

(65) Prior Publication Data
US 2005/0244052 A1 Nov. 3, 2005

(51) Int. Cl.
*G06K 9/00* (2006.01)

(52) U.S. Cl. .................. 382/162; 382/264; 382/266; 382/300

(58) Field of Classification Search .......... 382/162, 382/167, 199, 264, 266, 300; 348/273, 280
See application file for complete search history.

(56) References Cited

U.S. PATENT DOCUMENTS

| 5,541,653 | A | 7/1996 | Peters et al. | |
|---|---|---|---|---|
| 6,989,862 | B2 * | 1/2006 | Baharav et al. | 348/273 |
| 2002/0167602 | A1 * | 11/2002 | Nguyen | 348/280 |
| 2003/0052981 | A1 * | 3/2003 | Kakarala et al. | 348/272 |
| 2003/0169353 | A1 | 9/2003 | Rentao et al. | |
| 2004/0028271 | A1 | 2/2004 | Pollard et al. | |

OTHER PUBLICATIONS

Ramanath R et al—"Demosaicking as a Bilateral Filtering Process"—Proc of the SPIE vol. 4667—Jan. 2002.
Lukac R et al—"Normalized Color-Ratio Modeling for CFA Interpolation"—IEEE Transaction on Consumer Electronics vol. 50 No. 2—May 2004.

* cited by examiner

*Primary Examiner*—Phuoc Tran

(57) ABSTRACT

A method of processing a mosaic digital image includes simultaneously performing edge-sensitive denoising and color interpolation on a first color plane of the digital image. The interpolation fills in missing pixel information in the first color plane.

40 Claims, 5 Drawing Sheets

EDGE-SENSITIVE DENOISING AND COLOR INTERPOLATION OF DIGITAL IMAGES

BACKGROUND

A typical digital camera includes an array of photosensors, with each photosensor sensitive to only a single color of light. For example, each photosensor is sensitive to one of red, green and blue light. During image acquisition, an image is focused on the photosensor array, and each photosensor measures or "samples" a single color of the image. If red-sensitive, green-sensitive and blue-sensitive photosensors can be located at each pixel, the photosensor array can acquire an image having "full color" at each pixel.

The photosensor arrays of certain digital cameras have only a single photosensor at each pixel location. These cameras produce digital images that do not have full color information at each pixel. Since each photosensor is sensitive to only a single color, the photosensor array produces a digital image having only a single color sample at each pixel. Consider a digital camera that produces a digital image having one of red, green and blue sampled information at each pixel. Information about the other two colors at each pixel is missing. This undersampled digital image is referred to as a "mosaic" image.

A demosaicing algorithm may be used to transform an undersampled digital image into a digital image having full color information at each pixel value. A typical demosaicing algorithm interpolates the missing pixel information from the sampled pixel values in the mosaic image.

Edges and other abrupt photometric transitions present a particular problem to demosaicing. A simple demosaicing algorithm such as bilinear interpolation fills in a missing pixel value by taking an average of sampled values from neighboring pixels. However, some of those neighbors might lie on opposite sides of an edge. Some of the neighbors lying on one side of the edge might belong to one object, while the other neighbors lying on the other side might belong to a different object. Consequently, the interpolated pixel information might not describe either object. Since traditional bilinear interpolation does not account for edges, color information at edges in demosaiced images can be distorted.

More complex demosaicing algorithms try to account for edges. Still, even the more complex demosaicing algorithm can introduce artifacts into demosaiced images. Zippering and fringing are typical artifacts at edges in the demosaiced image. These artifacts can degrade image quality.

A digital camera can perform the demosaicing. On-board demosaicing allows a digital camera to display and upload images having full color at each pixel. However, memory and processing power of a typical digital camera are limited. The limited memory and processing power can constrain the complexity of the demosaicing algorithm and hamper the ability to account for edges and reduce artifacts at the edges during demosaicing.

A demosaicing algorithm that is simple and fast, and that reduces edge blurring and the visibility of certain artifacts at edges, is desirable. Such a demosaicing algorithm is especially desirable for digital cameras.

There is also a need to reduce noise in the demosaiced images. If the mosaic images are noisy, the demosaiced images produced by the demosaicing algorithm could be noisy too. Further, if post-processing such as image sharpening is performed on the demosaiced images, the post-processing could significantly increase structured or unstructured noise. Such noise might not be perceptible in unsharpened images, but it might become very visible after sharpening.

Still further, the demosaicing could create cross-hatching artifacts on critically sampled regions (that is, regions containing components with spatial frequency close to the sampling frequency) of the sharpened images.

A demosaicing algorithm with embedded noise reduction capability is desirable.

SUMMARY

According to one aspect of the present invention, a method of processing a mosaic digital image includes simultaneously performing edge-sensitive denoising and color interpolation on a first color plane of the digital image. The interpolation fills in missing pixel information in the first color plane.

Other aspects and advantages of the present invention will become apparent from the following detailed description, taken in conjunction with the accompanying drawings, illustrating by way of example the principles of the present invention.

DETAILED DESCRIPTION

Figure 1:
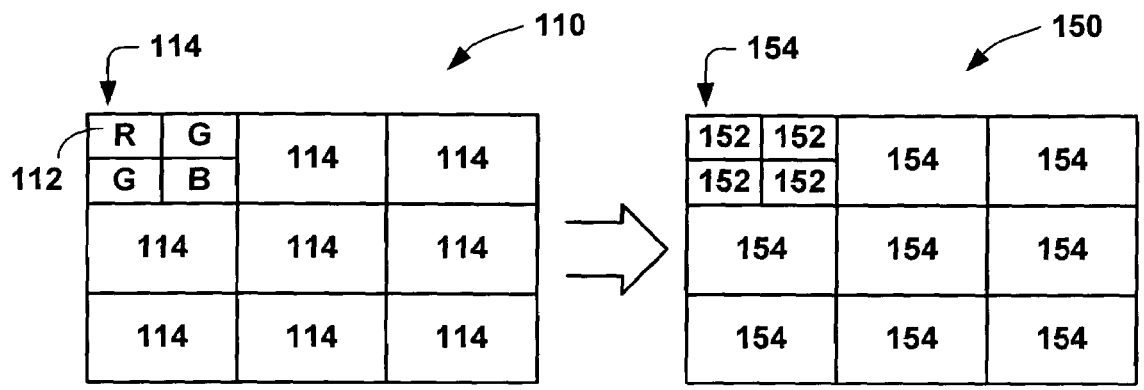
FIG. 1 is an illustration of a photosensor arrangement for a typical digital camera, and corresponding pixels of a mosaic image.

As shown in the drawings for purposes of illustration, the present invention is embodied in an algorithm for processing of a mosaic image. Each pixel of the mosaic image has less than full information. The algorithm includes performing edge-sensitive denoising and color interpolation simultaneously. Resulting is an output image having full color information at each pixel. The algorithm is simple and fast, and it reduces edge blurring and the visibility of certain artifacts at edges. The algorithm also reduces structured noise on smooth regions of sharpened outputs, as well as cross-hatching artifacts.

Also for the purposes of illustration, the algorithm will be described in connection with a photosensor arrangement known as a Bayer color filter array (CFA). Such a CFA is used in certain digital cameras.

Reference is made to FIG. 1, which illustrates a photosensor array 110 having photosensors 112 arranged in a Bayer CFA. The photosensors 112 are arranged in 2×2 cells 114. Each cell 114 consists of two photosensors sensitive to green (G) light only, one photosensor sensitive to red (R) light only, and one photosensor sensitive to blue (B) light only. The cells 114 are repeated (tiled) across the photosensor array 110.

FIG. 1 also illustrates a mosaic digital image 150. Each block 154 of the mosaic image 150 corresponds to a cell 114 of the photosensor array 110. Each pixel 152 of the mosaic image 150 is described by an n-bit word, and each n-bit word provides one of red, green and blue color sampled information. In each 2×2 block 154 of the mosaic image 150, green information is sampled at two pixels, red information is sampled at one pixel, and blue information is sampled at one pixel.

Figure 2:
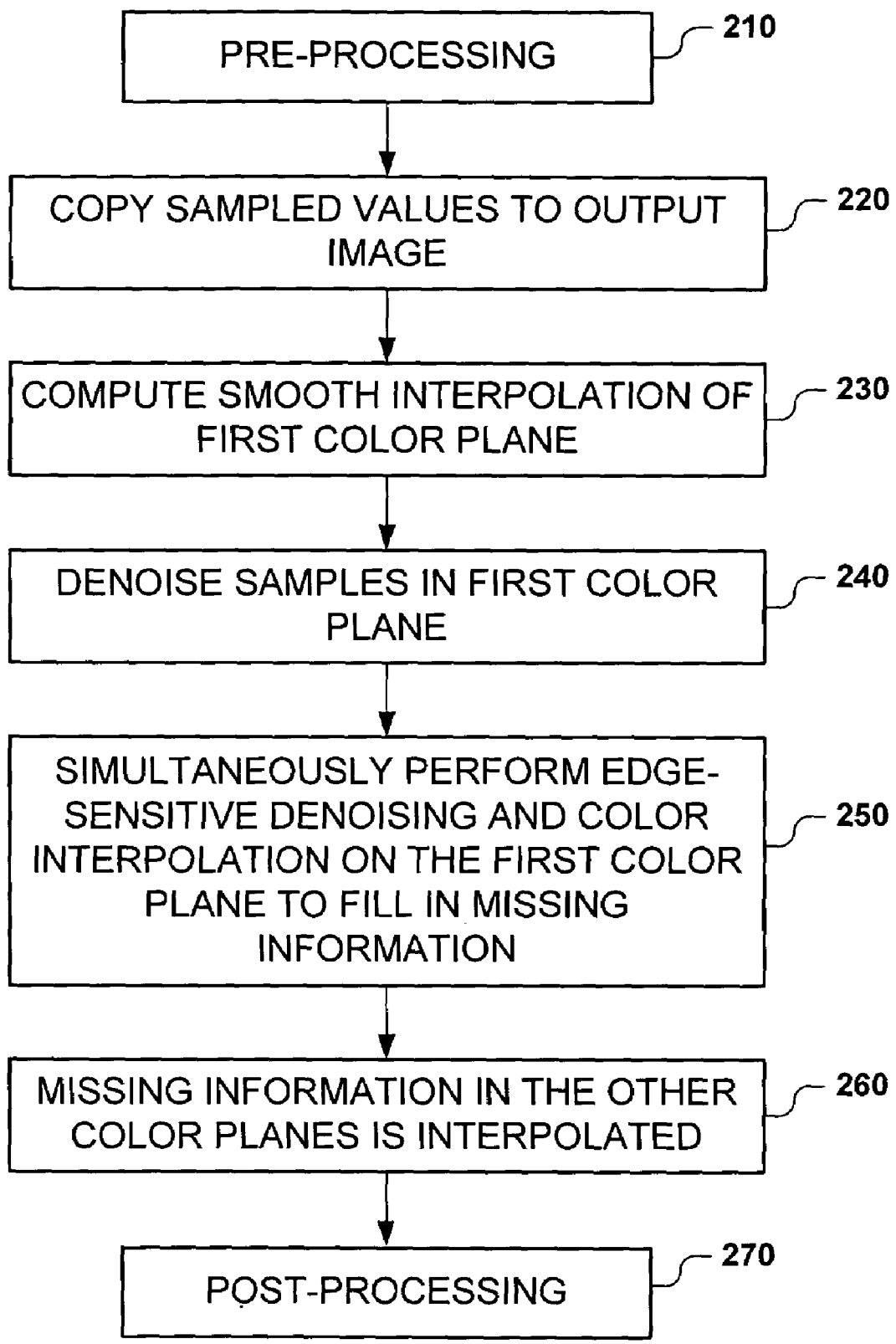
FIG. 2 is an illustration of a method of performing image processing in accordance with an embodiment of the present invention.

Reference is made to FIG. 2, which illustrates a method of processing a mosaic image into an output image having full color information at each pixel. Each pixel of the output image may be represented by a digital word including n-bits for red information, n-bits for green information, and n-bits for blue information.

The sampled values may be pre-processed (210). The pre-processing is application-specific. In a digital camera for example, pre-processing between image acquisition and demosaicing may include flare reduction, data linearization, and color balance.

The sampled values of the mosaic image are copied to their corresponding positions in the output image (220). For example, a mosaic image with a Bayer pattern has pixel inputs m(i,j), where i and j are indices to the rows and columns of the mosaic image. The sampled values of the mosaic image may be copied to the output image as follows:

$I_R(i,j)=m(i,j)$ for all red samples (i and j even), $I_G(i,j)=m(i,j)$ for all green samples (i+j odd), and $I_B(i,j)=m(i,j)$ for all blue samples (i and j odd), where $I_R(i,j)$ represents red information at pixel (i,j) of the output image, $I_G(i,j)$ represents green information at pixel (i,j) of the output image, and $I_B(i,j)$ represents blue information at pixel (i,j) of the output image.

A smooth estimation of the first color plane is computed (230). The smooth estimation may be a bilinear interpolation of the samples in the first color plane. Bilinear interpolation on the green plane may be computed on the green plane of a mosaic image with a Bayer pattern as $\bar{o}_G=m_G*k_2$, where * denotes linear convolution, $m_G$ is the sampled values in the green plane, and $$k_2 = \begin{bmatrix} 0 & 0.25 & 0 \\ 0.25 & 1 & 0.25 \\ 0 & 0.25 & 0 \end{bmatrix}.$$

If bilinear interpolation is performed on the green plane of a mosaic image with a Bayer pattern, however, zippering artifacts could occur on edges. The zippering artifacts may be avoided by considering the two green samples of each cell separately. Those green samples having red samples as North-South neighbors (e.g., the green sample in the lower left corner of the cell 114 in FIG. 1) are referred to as G1 samples; and those green samples having red samples as East-West neighbors (e.g., the green sample in the upper right corner of the cell 114 in FIG. 1) are referred to as G2 samples. The G1 samples have the same spatial characteristic as the red and blue samples, and the G2 samples have the same spatial characteristic as the red and blue samples, and thus the bilinear interpolation of each of the G1 and G2 samples yields a smooth estimation. Therefore, the sum of the bilinear interpolation of the G1 samples with the sum of the bilinear interpolation of the G2 samples also yields a smooth estimation. Such a smooth estimation may be computed as $\bar{o}_G=m_G*k_1/2$, where * denotes linear convolution, $m_G$ is the sampled values in the green plane, and $k_1$ is $$k_1 = \begin{bmatrix} 0.25 & 0.5 & 0.25 \\ 0.5 & 1 & 0.5 \\ 0.25 & 0.5 & 0.25 \end{bmatrix}.$$

This smooth estimation does not contain artifacts that would otherwise occur in bilinear interpolation of the green plane. Moreover, the smooth estimation is blurrier than a bilinear interpolation (which also can be advantageous).

The red or blue plane may be used instead of the green plane. The smooth estimations of the red or blue plane may be a bilinear interpolation of the samples. Smooth estimations of the red or blue plane may be computed as $\bar{o}_R=m_R*k_1$, or $\bar{o}_B=m_B*k_1$, where $m_R$ and $m_B$ are the sampled values in the red and blue planes. However, the green color plane is preferred because it corresponds to the largest component of the luminance, and because it has twice the amount of information in a Bayer cell compared to the other color planes (the green plane yields a stronger response by the human visual system than either the red plane or the blue plane).

Figure 3:
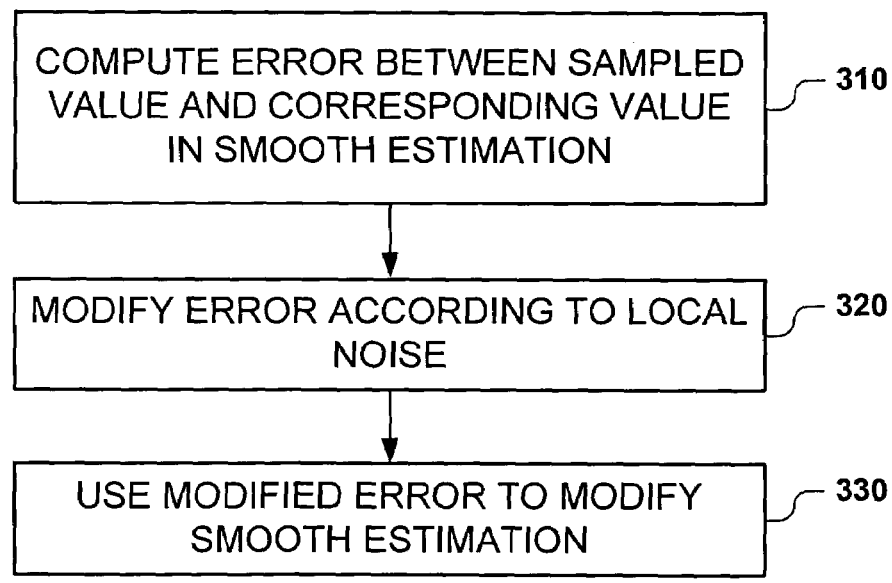
FIG. 3 is an illustration of a method of performing edge-sensitive denoising of sampled values in accordance with an embodiment of the present invention.

The sampled values of the first color plane may be denoised (240). Denoising may follow the general approach illustrated in FIG. 3: an error between a sampled value and the value of a corresponding pixel in the smooth estimation are computed (310), the error is modified according to local noise level (320), and the modified error is used to modify the corresponding pixel in the smooth estimation (330).

For example, the sampled values in the green plane may be denoised by computing $I_G(i,j)=\bar{o}_G(i,j)+\psi_\sigma[m_G(i,j)-\bar{o}_G(i,j)]$, where $\psi_\sigma$ is an influence function that depends upon the noise level $\sigma$. The value $\psi_\sigma(x)$ should be close to zero if $|x|$ is smaller than $\sigma$ and close to x otherwise. Thus $I_G(i,j)$ should be close to m(i,j) if the absolute difference of $m_G(i,j)-\bar{o}_G(i,j)$ is larger than $\sigma$ and close to $\bar{o}_G(i,j)$ otherwise. Such filtering is edge-sensitive because the "error" grows significantly when one is close to an edge. In a smooth region, far from an edge, the region is smoothed. In a region near an edge, the region is not smoothed. Thus the denoising preserves strong features such as edges (i.e., it doesn't blur edges), yet removes small features such as noise.

Figure 4:
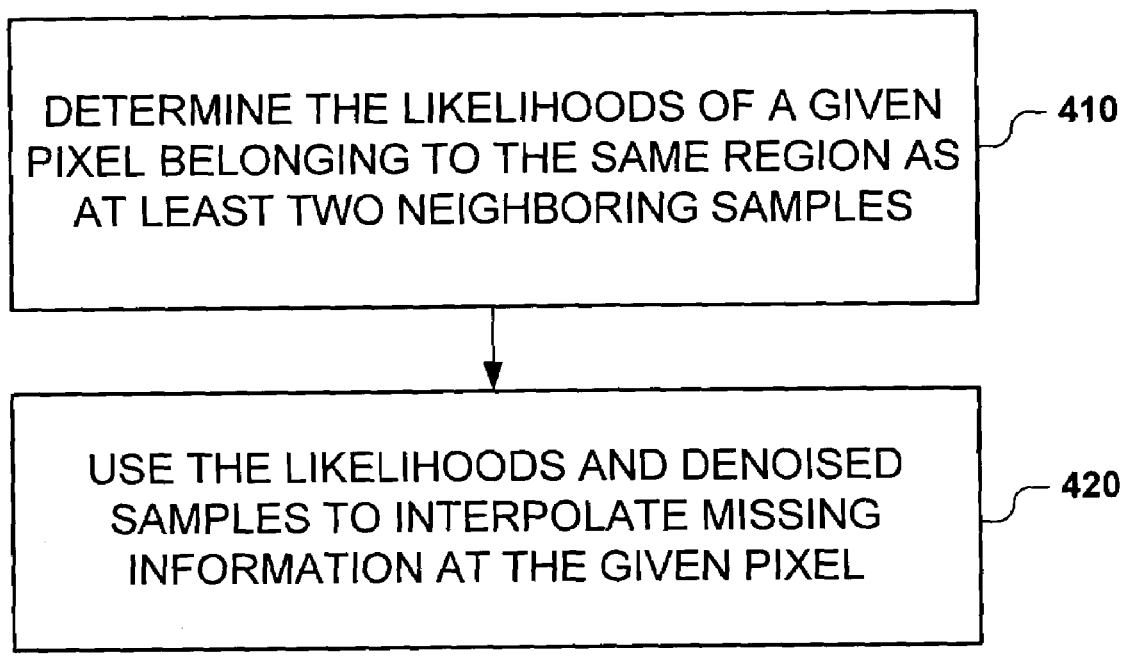
FIG. 4 is an illustration of a method of performing denoising and color interpolation in accordance with an embodiment of the present invention.

Missing information in the first color plane of the output image is added to the output image by simultaneously performing edge-sensitive denoising and color interpolation on the first color (250). As illustrated in FIG. 4, the edge-sensitive denoising and color interpolation of a given pixel includes determining a likelihood of whether the given pixel belongs to the same region as each of at least two neighboring denoised samples of the first color (410), the neighboring samples in different directions relative to the given pixel; and using the likelihoods and the denoised neighboring samples to interpolate the first color at the given pixel (420). A sample having a higher likelihood of belonging to the same region as the given pixel is given a higher weight in the interpolation. Different approaches for performing the simultaneous denoising and color interpolation will be described below. All of the approaches are sensitive to edges in the smooth estimation.

Missing information in the other color planes is interpolated and added to the output image (260). Blurring kernels may be used to populate the red and blue color planes as follows:

$$I_R = I_G + (\bar{o}_R - \bar{o}_G) * h \text{ and}$$

$$I_B = I_G + (\bar{o}_B - \bar{o}_G) * h$$

where h is a blurring kernel. The blurring kernel h may be $$h = \begin{bmatrix} 1 & 1 & 1 \\ 1 & 1 & 1 \\ 1 & 1 & 1 \end{bmatrix} \Big/ 9.$$

This blurring kernel can reduce color artifacts. A larger blurring kernel h (e.g., a 5×5 kernel) can further reduce the color artifacts.

Another method of interpolating the missing information in each of the red and blue color planes includes performing the simultaneous edge-sensitive denoising and color interpolation. Still other methods of interpolating the missing information in each of the red and blue color planes include bilinear interpolation, affine interpolation, and a canonical correlation method. These other methods are described in detail in assignee's U.S. Ser. No. 10/743,623 filed Dec. 22, 2003 and incorporated herein by reference. At the completion of step 260, each pixel I(i,j) in the output image has red information $I_R(i,j)$, green information $I_G(i,j)$, and blue information $I_B(i,j)$.

Post processing may be performed on the output (demosaiced) image (270). The post-processing is application-specific. In a digital camera for example, the post-processing may include color transformation, tone reproduction, sharpening, compression, and adaptive lighting.

Figure 5:
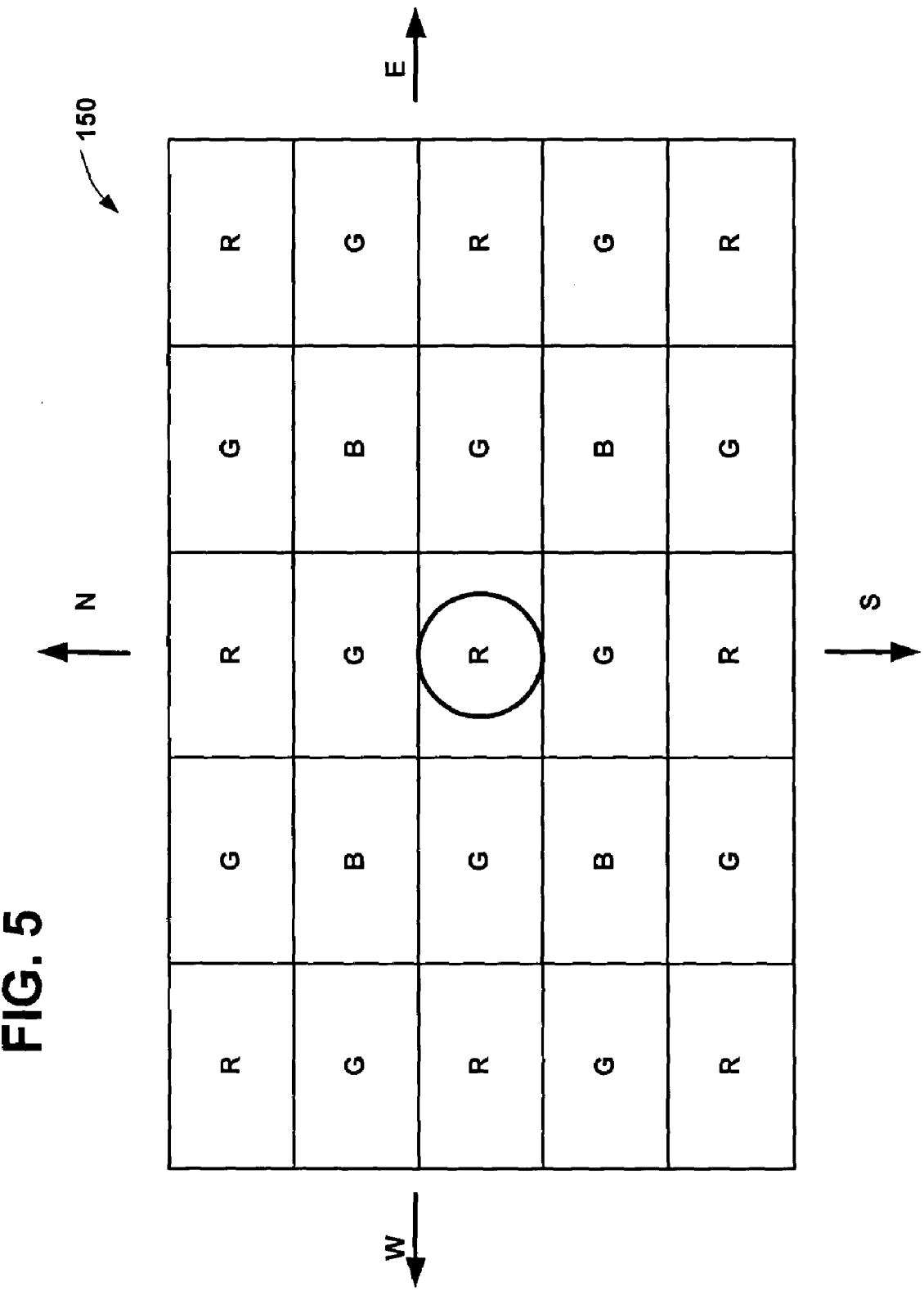
FIG. 5 is an illustration of a pixel to be processed and directions of neighboring pixels in a mosaic image.

Different approaches for performing the simultaneous denoising and color interpolation will now be described. The description of a first approach will refer to FIG. 5. FIG. 5 shows raw samples of a mosaic image 150. The given pixel (i.e., the pixel being processed) is circled. The given pixel in FIG. 5 has a sampled red value, but no sampled values for green or blue.

The first approach involves determining a likelihood of whether the given pixel belongs to the same region as each of at least two other pixels having smooth estimates of the first color. The other pixels are in different directions relative to the given pixel. The samples and the likelihoods and the smooth estimates of the other pixels are used to interpolate the green information at the given pixel. This first approach may be performed according to equation (1).

$$I_G(i,j) = \bar{o}_G(i,j) + \frac{\sum_{(a,b) \in N_4} \psi_\sigma [m(i+a, j+b) + \Delta_{a,b}(i,j) - \bar{o}_G(i,j)] w_{a,b}(i,j)}{\sum_{(a,b) \in N_4} w_{a,b}(i,j)}. \quad (1)$$

The term $N_4$ represents a neighborhood consisting of four pixels. The index (a,b) indicates the direction and number of pixels relative to the given pixel. For example, the neighborhood $N_4$ may consist of $\{(-1,0), (1,0), (0,-1) \text{ and } (0,1)\}$. The green samples are due west $(-1,0)$, due east $(1,0)$, due south $(0,-1)$ and due north $(0,1)$ of the given pixel. Equation (1) holds only for those pixels (i,j) without green samples in the mosaic image 150.

Weight term $w_{a,b}$ may be computed as $$w_{a,b}(i,j) \triangleq \rho[|\bar{o}_G(i+a, j+b) - \bar{o}_G(i,j)| + |\bar{o}_G(i+2a, j+2b) - \bar{o}_G(i+a, j+b)|].$$

The first absolute difference $|\bar{o}_G(i+a, j+b) - \bar{o}_G(i,j)|$ in the weight term $w_{a,b}$ represents the intensity of the difference between the smooth green estimate of the given pixel and that of the nearest green pixel in the direction determined by (a,b); and the second absolute difference in the weighting term $|\bar{o}_G(i+2a, j+2b) - \bar{o}_G(i+a, j+b)|$ represents the intensity of the difference between the smooth green estimate of the nearest green pixel in the direction determined by (a,b) and that of the next pixel in the same direction. Thus the weight terms $w_{a,b}$ are based on smooth estimates, not raw samples. Use of the smooth estimates instead of raw samples in the second absolute difference allows differences between adjacent neighboring pixels to be considered. If raw samples are used, in contrast, the differences are between neighbors that are two pixels apart.

The function $\rho(\ )$ is referred to as a similarity function. The similarity function is used to determine the likelihood of a given pixel belonging to the same region as a neighboring pixel as a function of the sum of absolute differences corresponding to that direction. A large absolute difference in sampled values over a short distance (that is, an abrupt transition) is assumed to result from an edge. Thus a large sum of absolute differences in a given direction implies that the given pixel lies on one side of an edge (and belongs to one object), and the neighbor at that direction lies on the other side of the edge (and belongs to a different object). Therefore, a low likelihood exists that the green values of the given pixel and neighbor are similar. Exemplary similarity functions $\rho(x)$ include, but are not limited to, the following:

$$\rho(x) = \exp\left(\frac{-x^2}{\sigma^2}\right)$$

$$\rho(x) = \frac{1}{|x| + 1}$$

$$\rho(x) = \min\left(\frac{T}{|x|}, 1\right)$$

$$\rho(x) = 1 / \max(|x|, 1)$$

where T and $\sigma$ are scaling parameters that account for the expected noise level in the raw samples. The input x corresponds to a sum of absolute differences.

The term $\Delta_{a,b}$ represents high frequency correction terms such as $\Delta_{a,b}(i,j) \triangleq \lambda[m(i,j) - m(i+2a, j+2b)]$. The quantity $[m(i,j) - m(i+2a, j+2b)]$ represents the difference between the red sample on the given pixel and the nearest red samples in the direction determined by (a,b) relative to the given pixel.

The parameter $\lambda$ is a tunable parameter that corrects the interpolated value for camera-specific items, such as image resolution, camera optics, and scene distance (and, therefore, is used in $\Delta_{a,b}(i,j)$ but not the weight terms $w_{a,b}$). If device resolution is small or edges are too abrupt, the parameter $\lambda$ may have a value between 0.5 and 1. For mid-resolution cameras, the parameter $\lambda$ may have a value of 0.5. For high resolution cameras, the parameter $\lambda$ may have a value of less than 0.5.

A second approach is similar to the first approach, except that $\lambda = 0$. By setting $\lambda = 0$, the high frequency correction term $\Delta_{a,b}$ is not used, whereby equation (1) is reduced to the following:

$$I_G(i, j) = \bar{o}_G(i, j) + \frac{\sum_{(a,b)\in N_4} \psi_\sigma[m(i+a, j+b) - \bar{o}_G(i, j)]w_{a,b}(i, j)}{\sum_{(a,b)\in N_4} w_{a,b}(i, j)} \quad (2)$$

and $w_{a,b}(i,j) \doteq \rho[|\bar{o}_G(i+a, j+b) - \bar{o}_G(i,j)|]$. Setting $\lambda=0$ can cause a posterization effect on the output image, but it can significantly reduce the computation of the output image.

A third approach involves taking the psi-sigma function ($\psi_\sigma$) and the subtraction by $\bar{o}_G$ out of the loop of equation (1). This leads to the equation (3).

$$I_G(i, j) = \bar{o}_G(i, j) + \psi_\sigma \left[ \frac{\sum_{(a,b)\in N_4} [m(i+a, j+b) + \Delta_{a,b}(i, j) - \bar{o}_G(i, j)]w_{a,b}(i, j)}{\sum_{(a,b)\in N_4} w_{a,b}(i, j)} - \bar{o}_G(i, j) \right] \quad (3)$$

This third approach (referred to as post-selective filtering) is faster than the first approach, since the psi-sigma function is applied only once for each input pixel (i,j). In contrast, the first approach (referred to as pre-selective filtering) applies the psi-sigma function to each pixel (a,b) in a local neighborhood of each input pixel (i,j). The pre-selective filtering, however, tends to produce less noise around edges in the output image.

A fourth approach involves combining the simplifications in the second approach (setting $\lambda=0$) and the third approach (post-selective filtering). The fourth approach may be performed according to equation (4).

$$I_G(i, j) = \bar{o}_G(i, j) + \psi_\sigma \left[ \frac{\sum_{(a,b)\in N_4} m(i+a, j+b)w_{a,b}(i, j)}{\sum_{(a,b)\in N_4} w_{a,b}(i, j)} - \bar{o}_G(i, j) \right]. \quad (4)$$

To further improve processing speed, a lookup table may be used instead of applying the psi-sigma function. The lookup table stores samples (that is, pre-computed values) of the psi-sigma function.

Yet another approach may involve making hard decisions about interpolated values instead of using likelihoods. For example, define $\alpha = |2\bar{o}_G(i,j) - \bar{o}_G(i+2,j) - \bar{o}_G(i-2,j)| + |\bar{o}_G(i+1,j) - \bar{o}_G(i-1,j)|$ and $\beta = |2\bar{o}_G(i,j) - \bar{o}_G(i,j+2) - \bar{o}_G(i,j-2)| + |\bar{o}_G(i,j+1) - \bar{o}_G(i,j-1)|$.

The weighting terms $w_{a,b}(i,j)$ may be computed as $\alpha < \beta \Rightarrow w_{1,0} = w_{-1,0} = 1$ $w_{0,1} = w_{0,-1} = 0$ $\alpha > \beta \Rightarrow w_{1,0} = w_{-1,0} = 0$ $w_{0,1} = w_{0,-1} = 1$ $\alpha = \beta \Rightarrow w_{1,0} = w_{-1,0} = w_{0,1} = w_{0,-1} = 1$.

The algorithms above are not limited to a Bayer CFA. The method may be applied to other color filter arrays.

The method is not limited to the N, S, E and W directions, or the four closest neighbors. Larger neighborhoods may be used, and pixels of different distances may be used. Weights may be reduced as distance increases from the given pixel.

Other methods of interpolating the missing information in each of the red and blue color planes include bilinear interpolation, affine interpolation, and a canonical correlation method.

Figure 6:
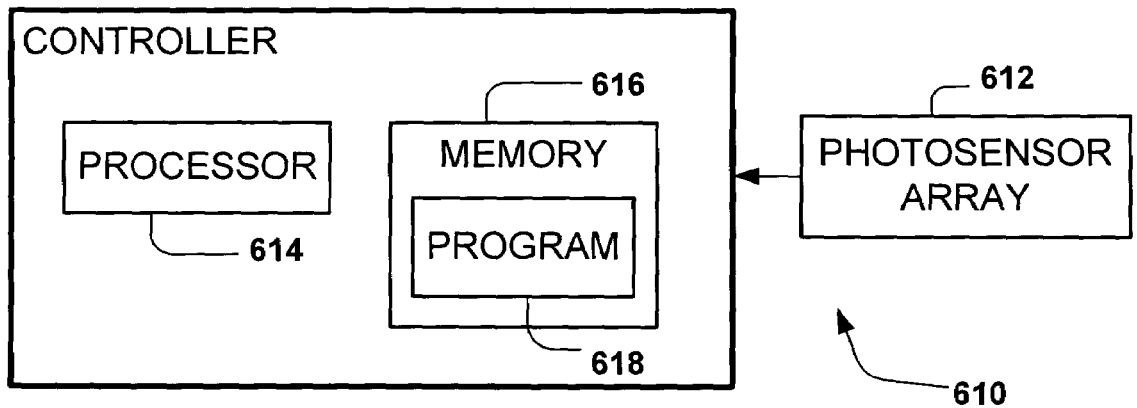
FIG. 6 is an illustration of an apparatus for performing image processing in accordance with an embodiment of the present invention.

Reference is made to FIG. 6, which illustrates an exemplary hardware implementation. A digital camera 610 includes a photosensor array 612 such as a CCD. The photosensors of the array 612 may be arranged in a Bayer CFA. The array 612 produces mosaic digital images.

The digital camera 610 also includes a digital signal processor 614 and memory 616 (e.g., EPROM). A program 618 encoded in the memory 616 instructs the digital signal processor 614 to transform mosaic images into digital images having full color information at each pixel in accordance with an embodiment of the present invention. The program 618 may include a lookup table for different values of the similarity function. Weights are computed on the fly, and applied to the pixels using an algorithm.

Another implementation (not shown) may include an application-specific integrated circuit (ASIC). The ASIC includes a processor for transforming mosaic images into digital images having full color information at each pixel in accordance with an embodiment of the present invention. The processor may include a state machine, or it may include an embedded processor and memory, or it may have some other design.

Figure 7:
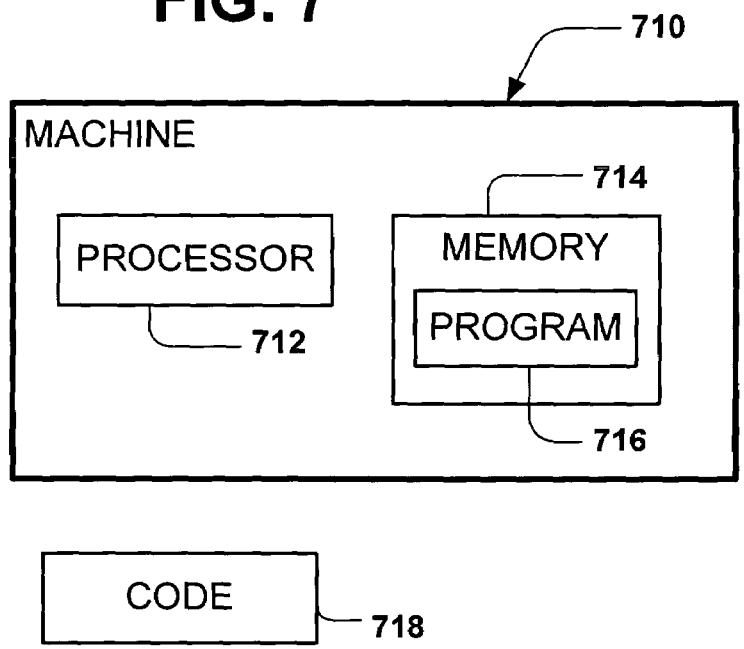
FIG. 7 is an illustration of an apparatus for performing image processing in accordance with an embodiment of the present invention.

Reference is now made to FIG. 7, which illustrates another hardware implementation. A digital imaging system 710 includes a general purpose processor 712 and memory 714 for instructing the processor 712 to process mosaic images in accordance with an embodiment of the present invention. The system 710 may be, for example, a personal computer. Mosaic images may be supplied to the system 710 directly by a capture device (e.g., a scanner, a digital camera) or indirectly (via the Internet, accessed from remote or local storage, etc.).

A machine for generating the program may be a personal computer such as the one shown in FIG. 7. Source code is generated, compiled into executable code, and distributed.

The executable code may be distributed in variety of ways. For example, the executable code may be distributed to a digital camera by burning the code into a memory 616 (e.g., the EPROM) of the digital camera 610. The executable code can be distributed to another computer via a network transmission, removable storage medium 718 (e.g., CD), etc.

Although specific embodiments of the present invention have been described and illustrated, the present invention is not limited to the specific forms or arrangements of parts so described and illustrated. Instead, the present invention is construed according to the following claims.

The invention claimed is:

1. A method of processing a digital image, each pixel of the digital image having less than full information, the method comprising simultaneously performing edge-sensitive denoising and color interpolation on a first color plane of the digital image, wherein simultaneously performing the denoising and color interpolation on a pixel missing the first color information includes using smooth estimates and sampled values of neighboring pixels lying in different directions to generate the first color information.

2. The method of claim 1, wherein simultaneously performing the denoising and color interpolation on a pixel missing the first color information further includes using likelihoods of the pixel belonging to the same region as its neighboring pixels.

3. The method of claim 2, wherein the likelihoods are based on the smooth estimates.

4. The method of claim 1, wherein simultaneously performing the denoising and color interpolation on a pixel missing the first color information further includes using high frequency correction information along with the sampled values and smooth estimates.

5. The method of claim 1, wherein post-selective processing is performed.

6. The method of claim 1, wherein simultaneously performing the denoising and color interpolation includes:
computing a smooth estimation of a first color plane; and
using the smooth estimates from the smooth estimation and also using the sampled values to generate the first color information.

7. The method of claim 6, wherein using the smooth estimation and the sampled values to generate missing information at a pixel includes computing an error between a sampled value and the value of a corresponding pixel in the smooth estimation, modifying the error according to noise level, and using the modified error to modify the corresponding pixel in the smooth estimation.

8. The method of claim 6, wherein the smooth estimation of a green plane is computed as $\bar{o}_G = m_G * k_1 / 2$, where * denotes linear convolution, $m_G$ is the sampled values in the green plane, and $k_1$ is $$k_1 = \begin{bmatrix} 0.25 & 0.5 & 0.25 \\ 0.5 & 1 & 0.5 \\ 0.25 & 0.5 & 0.25 \end{bmatrix}.$$

9. The method of claim 6, wherein the color interpolation is sensitive to edges in the smooth estimation.

10. The method of claim 1, further comprising smoothing the sampled values in the first color plane prior to performing the edge-sensitive denoising and color interpolation on the missing pixel information in the first color plane.

11. The method of claim 1, wherein the simultaneous denoising and color interpolation on each pixel missing green information is performed according to $$I_G(i,j) = \bar{o}_G(i,j) + \frac{\sum_{(a,b) \in N_4} \psi_\sigma[m(i+a, j+b) + \Delta_{a,b}(i,j) - \bar{o}_G(i,j)]w_{a,b}(i,j)}{\sum_{(a,b) \in N_4} w_{a,b}(i,j)} \text{ and}$$

$\Delta_{a,b}(i,j) \triangleq \lambda[m(i,j) - m(i+2a, j+2b)]$ and $w_{a,b}(i,j) \triangleq$ $\rho[|\bar{o}_G(i+a, j+b), -\bar{o}_G(i,j)| + |\bar{o}_G(i+2a, j+2b) - \bar{o}_G(i+a, j+b)|].$ 12. The method of claim 1, wherein the simultaneous denoising and color interpolation on each pixel missing green information is performed according to $$I_G(i,j) = \bar{o}_G(i,j) + \frac{\sum_{(a,b) \in N_4} \psi_\sigma[m(i+a, j+b) - \bar{o}_G(i,j)]w_{a,b}(i,j)}{\sum_{(a,b) \in N_4} w_{a,b}(i,j)}$$

where $w_{a,b}(i,j) \triangleq \rho[|\bar{o}_G(i+a, j+b) - \bar{o}_G(i,j)|].$

13. The method of claim 1, wherein the simultaneous denoising and color interpolation on each pixel missing green information is performed according to $$I_G(i,j) = \bar{o}_G(i,j) + \psi_\sigma\left[\frac{\sum_{(a,b) \in N_4} [m(i+a, j+b) + \Delta_{a,b}(i,j) - \bar{o}_G(i,j)]w_{a,b}(i,j)}{\sum_{(a,b) \in N_4} w_{a,b}(i,j)} - \bar{o}_G(i,j)\right].$$

14. The method of claim 1, wherein the simultaneous denoising and color interpolation on each pixel missing green information is performed according to $$I_G(i,j) = \bar{o}_G(i,j) + \psi_\sigma\left[\frac{\sum_{(a,b) \in N_4} m(i+a, j+b)w_{a,b}(i,j)}{\sum_{(a,b) \in N_4} w_{a,b}(i,j)} - \bar{o}_G(i,j)\right].$$

15. The method of claim 1, wherein denoised values are selectively blurred sampled values.

16. The method of claim 15, wherein the selective blurring is performed according to a weighting function that blurs noise yet allows details to be preserved.

17. The method of claim 16, wherein the weighting function is a psi-sigma weighting function.

18. The method of claim 17, wherein the psi-sigma function is pre-computed.

19. The method of claim 17, wherein the same psi-sigma function is applied to each pixel in a local neighborhood.

20. The method of claim 17, wherein different psi-sigma functions are applied to different pixels in a local neighborhood.

21. The method of claim 1, wherein the simultaneous denoising and interpolation are used to populate a green color plane before red and blue color planes are populated.

22. The method of claim 21, wherein blurring kernels are used to populate the red and blue color planes.

23. A processor for performing the method of claim 1.

24. An article including memory encoded with data for causing a processor to perform the method of claim 1.

25. A method of demosaicing a mosaic digital image, the method comprising copying samples of the mosaic image to an output image and also simultaneously performing edge-sensitive denoising and color interpolation to estimate missing information in a first color plane of the output image, wherein the denoising and color interpolation at a pixel includes computing an error between a sampled value and the value of a corresponding pixel in a smooth estimation of the first color plane, and using the error to generate the missing information at that pixel.

26. The method of claim 25, wherein the simultaneous denoising and color interpolation on the first color plane is performed according to $$I_G(i, j) = \overline{o}_G(i, j) + \frac{\sum_{(a,b) \in N_4} \psi_\sigma[m(i+a, j+b) + \Delta_{a,b}(i, j) - \overline{o}_G(i, j)] w_{a,b}(i, j)}{\sum_{(a,b) \in N_4} w_{a,b}(i, j)} \text{ and}$$

$$\Delta_{a,b}(i, j) \triangleq \lambda[m(i, j) - m(i+2a, j+2b)] \text{ and}$$

$$w_{a,b}(i, j) \triangleq$$

$$\rho[|\overline{o}_G(i+a, j+b) - \overline{o}_G(i, j)| + |\overline{o}_G(i+2a, j+2b) - \overline{o}_G(i+a, j+b)|].$$

27. The method of claim 25, wherein the simultaneous denoising and color interpolation on the first color plane is performed according to $$I_G(i, j) = \overline{o}_G(i, j) + \frac{\sum_{(a,b) \in N_4} \psi_\sigma[m(i+a, j+b) - \overline{o}_G(i, j)] w_{a,b}(i, j)}{\sum_{(a,b) \in N_4} w_{a,b}(i, j)}$$

where $w_{a,b}(i, j) \triangleq \rho[|\overline{o}_G(i+a, j+b) - \overline{o}_G(i, j)|].$ 28. The method of claim 25, wherein the simultaneous denoising and color interpolation on the first color plane is performed according to $$I_G(i, j) = \overline{o}_G(i, j) + \psi_\sigma \left[ \frac{\sum_{(a,b) \in N_4}[m(i+a, j+b) + \Delta_{a,b}(i, j) - \overline{o}_G(i, j)] w_{a,b}(i, j)}{\sum_{(a,b) \in N_4} w_{a,b}(i, j)} - \overline{o}_G(i, j) \right].$$

29. The method of claim 25, wherein the simultaneous denoising and color interpolation on the first color plane is performed according to $$I_G(i, j) = \overline{o}_G(i, j) + \psi_\sigma \left[ \frac{\sum_{(a,b) \in N_4} m(i+a, j+b) w_{a,b}(i, j)}{\sum_{(a,b) \in N_4} w_{a,b}(i, j)} - \overline{o}_G(i, j) \right].$$

30. Apparatus comprising:
means for accessing a digital mosaic image; and
means for simultaneously performing edge-sensitive denoising and color interpolation on a first color plane of the digital image, wherein a smooth estimation of a first color plane is performed, and wherein generating missing information at a pixel includes computing an error between a sampled value and a value of a corresponding pixel in the smooth estimation, modifying the error according to noise level, and using the modified error to modify the corresponding pixel in the smooth estimation.

31. Apparatus for processing a digital image, each pixel of the digital image having less than full information, the apparatus comprising a processor for simultaneously performing edge-sensitive denoising and color interpolation on a first color plane of the digital image, wherein the denoising and color interpolation includes using smooth estimates and sampled values of neighboring pixels lying in different directions to generate the missing information in the first color plane.

32. The apparatus of claim 31, wherein simultaneously performing the denoising and color interpolation on a pixel missing the first color information further includes using likelihoods of the pixel belonging to the same region as its neighboring pixels.

33. The apparatus of claim 32, wherein the likelihoods are based on the smooth estimates.

34. The apparatus of claim 31, wherein simultaneously performing the denoising and color interpolation on a pixel missing the first color information further includes using high frequency correction information along with the sampled values and smooth estimates.

35. The apparatus of claim 31, wherein post-selective processing is performed.

36. The apparatus of claim 31, wherein the simultaneous denoising and color interpolation on each pixel missing green information is performed according to $$I_G(i, j) =$$

$$\overline{o}_G(i, j) + \frac{\sum_{(a,b) \in N_4} \psi_\sigma[m(i+a, j+b) + \Delta_{a,b}(i, j) - \overline{o}_G(i, j)] w_{a,b}(i, j)}{\sum_{(a,b) \in N_4} w_{a,b}(i, j)} \text{ and}$$

$$\Delta_{a,b}(i, j) \triangleq \lambda[m(i, j) - m(i+2a, j+2b)] \text{ and}$$

$$w_{a,b}(i, j) \triangleq$$

$$\rho[|\overline{o}_G(i+a, j+b) - \overline{o}_G(i, j)| + |\overline{o}_G(i+2a, j+2b) - \overline{o}_G(i+a, j+b)|].$$

37. The apparatus of claim 31, wherein the simultaneous denoising and color interpolation on each pixel missing green information is performed according to $$I_G(i, j) = \overline{o}_G(i, j) + \frac{\sum_{(a,b) \in N_4} \psi_\sigma[m(i+a, j+b) - \overline{o}_G(i, j)] w_{a,b}(i, j)}{\sum_{(a,b) \in N_4} w_{a,b}(i, j)}$$

where $w_{a,b}(i, j) \triangleq \rho[|\overline{o}_G(i+a, j+b) - \overline{o}_G(i, j)|].$ 38. The apparatus of claim 31, wherein the simultaneous denoising and color interpolation on each pixel missing green information is performed according to $$I_G(i, j) = \overline{o}_G(i, j) +$$

$$\psi_\sigma \left[ \frac{\sum_{(a,b) \in N_4}[m(i+a, j+b) + \Delta_{a,b}(i, j) - \overline{o}_G(i, j)] w_{a,b}(i, j)}{\sum_{(a,b) \in N_4} w_{a,b}(i, j)} - \overline{o}_G(i, j) \right].$$

39. The apparatus of claim 31, wherein the simultaneous denoising and color interpolation on each pixel missing green information is performed according to $$I_G(i,j) = \overline{o}_G(i,j) + \psi_\sigma \left[ \frac{\sum_{(a,b) \in N_4} m(i+a, j+b) w_{a,b}(i,j)}{\sum_{(a,b) \in N_4} w_{a,b}(i,j)} - \overline{o}_G(i,j) \right].$$

40. An article for a processor, the article comprising memory encoded with data for causing the processor to process a digital image, the digital image having less than full information at each pixel, wherein the processing includes simultaneously performing edge-sensitive denoising and color interpolation on a first color plane of the digital image by using smooth estimates and sampled values of neighboring pixels lying in different directions to generate missing pixel information in the first color plane.

* * * * *

UNITED STATES PATENT AND TRADEMARK OFFICE
CERTIFICATE OF CORRECTION

PATENT NO. : 7,418,130 B2
APPLICATION NO. : 10/835609
DATED : August 26, 2008
INVENTOR(S) : Renato Keshet et al.

Page 1 of 1

It is certified that error appears in the above-identified patent and that said Letters Patent is hereby corrected as shown below:

In column 4, line 36, delete " $\tilde{\Psi}_\sigma$ " and insert -- $\Psi\sigma$ --, therefor.

In column 9, line 62, in Claim 11, delete " $\rho\left[\left|\bar{o}_G(i+a, j+b), -\bar{o}_G(i, j)\right|\right.$ " and insert -- $\rho\left[\left|\bar{o}_G(i+a, j+b) - \bar{o}_G(i, j)\right|\right.$ --, therefor.

Signed and Sealed this

Seventh Day of April, 2009

JOHN DOLL
*Acting Director of the United States Patent and Trademark Office*